United States Patent
Hu et al.

(10) Patent No.: US 10,848,562 B1
(45) Date of Patent: Nov. 24, 2020

(54) TEST SYSTEM FOR THE MOBILE IOT NETWORK AND TEST METHOD USING SUCH A TEST SYSTEM

(71) Applicant: SIGOS GmbH, Nuremberg (DE)

(72) Inventors: Shicheng Hu, Biot (FR); Goce Talaganov, Nuremberg (DE); Vlad Bratu, Nuremberg (DE)

(73) Assignee: SIGOS GmbH, Nuremberg (DE)

( * ) Notice: Subject to any disclaimer, the term of this patent is extended or adjusted under 35 U.S.C. 154(b) by 0 days.

(21) Appl. No.: 16/412,459

(22) Filed: May 15, 2019

(51) Int. Cl.
| | |
|---|---|
| *H04L 29/08* | (2006.01) |
| *H04W 4/38* | (2018.01) |
| *H04W 24/08* | (2009.01) |
| *H04W 52/02* | (2009.01) |
| *H04W 8/22* | (2009.01) |

(52) U.S. Cl.
CPC ............... *H04L 67/12* (2013.01); *H04W 4/38* (2018.02); *H04W 8/22* (2013.01); *H04W 24/08* (2013.01); *H04W 52/0216* (2013.01)

(58) Field of Classification Search
CPC .......... H04L 67/12; H04W 4/38; H04W 8/22; H04W 24/08; H04W 52/0216
See application file for complete search history.

(56) References Cited

U.S. PATENT DOCUMENTS

| | | | |
|---|---|---|---|
| 7,831,249 | B2 | 11/2010 | Löhlein et al. |
| 9,768,893 | B1 | 9/2017 | Wank et al. |
| 10,097,981 | B1 | 10/2018 | Talaganov et al. |
| 2006/0046710 | A1 | 3/2006 | Lohlein et al. |
| 2011/0319071 | A1* | 12/2011 | Beppler ................. H04W 48/18 455/424 |
| 2014/0089904 | A1* | 3/2014 | Wray ................... G06F 11/3672 717/135 |
| 2017/0094541 | A1* | 3/2017 | Ngai ....................... H04W 4/30 |

FOREIGN PATENT DOCUMENTS

| | | |
|---|---|---|
| DE | 102005027027 | 7/2014 |
| WO | 2004049746 A1 | 6/2004 |

OTHER PUBLICATIONS

SIGOS GMBH, SITE system Description, Oct. 31, 2013 (Year: 2013).*
SIGOS, SIGOS White Paper regarding OTT Bypass Detection, Oct. 20, 2016 (Year: 2016).*

* cited by examiner

*Primary Examiner* — Tejis Daya
(74) *Attorney, Agent, or Firm* — Smartpat PLC

(57) ABSTRACT

An active test system (1) for a mobile IoT network (2) providing connectivity and services to mobile IoT (MIoT) devices of low power wide area (LPWA) technologies is presented. The test system has at least one test probe (3) connected to the MIoT network (2) via an LTE-Uu interface (5) and/or at least one test probe connected to the MIoT network via an S1 interface. A central test unit (5*a*) is connected (8) to the at least one test probe (3) via a wireless backhaul network or a fixed IP network (7). A SIM multiplexer (12) is provided to transfer SIM data to the at least one test probe (3) in test fields. A test system with enhanced capabilities assure mobile IoT experience.

16 Claims, 4 Drawing Sheets

TEST SYSTEM FOR THE MOBILE IOT NETWORK AND TEST METHOD USING SUCH A TEST SYSTEM

TECHNICAL FIELD

The invention relates to an active test system for a mobile IoT network. Further, the invention relates to a test method using such a test system.

BACKGROUND

Test systems for mobile networks are known e.g. from U.S. Pat. No. 10,097,981 B1, from U.S. Pat. No. 7,831,249 B2 and from WO 2004/049746 A1.

It is an object of the invention to enhance the capabilities of such a test system for testing mobile networks.

SUMMARY

The object is met by an active test system for a mobile IoT network providing connectivity and services to mobile IoT (MIoT) devices of low power wide area (LPWA) technologies. It includes at least one test probe connected to the MIoT network via an LTE-Uu interface and/or at least one test probe connected to the MIoT network (2) via a S1 interface. A central test unit is connected to the at least one test probe via a wireless backhaul network or a fixed IP network. A SIM multiplexer transfers SIM data to the at least one test probe in test fields.

The test system according to the invention is capable of performing test of a mobile IoT (Internet of Things) network providing connectivity and rendering services to mobile IoT (MIoT) devices. Such test is an active test i.e. requires at least one component to actively initiate a respective test method. For example, the central test unit or a part of it may be such component for actively initiating the test method.

The mobile IoT network to be tested is considered as a subtype of the installed 4G networks enhanced with LPWA (Low Power Wide Area) technologies for device power saving, enhanced coverage and transmitting a small amount of data, tolerant latency.

The LPWA technology installed can be LTE-M and/or NB-IoT. The LPWA mobile device connected to the MIoT networks can be a smart meter, a home automation device, a building automation device, part of a smart grid, a part of industrial production line or a pipeline management, a part of automotive, a part of a transportation device or logistics, a drone, a part of a home security device, part of a patient monitoring device, part of an agriculture device serving e.g. irrigation or shadowing, part of a street lighting device, part of a tracking device, part of an industrial asset management device, part of a retail/point of sale device or part of a wearable device, e.g. part of a wristwatch or part of a smartphone. Also, voice service via LTE-M can be tested.

With such test systems, the MIoT network connectivity test, and/or the MIoT application platform test can be performed. The test system can be adapted and install one or more test probes according to the IoT network architecture and the scalability. The test probes can be placed at different locations (test fields) within a single IoT network or across multiple interconnected networks. In particular, data communication embodied by a SIM of the mobile IoT device can be simulated and/or emulated either over the LTE-Uu radio interface or the S1 core network interface.

The SIM multiplexer may transfer the SIM data virtually and/or securely to the at least one test probe.

The SIM multiplexer can be embodied as a support to carry multiple SIMs, e.g. up to 3 SIMs or more.

The test system can be configured to run a mobile IoT test procedure deploying end-to-end active test methodology between the at least one test probe and the MIoT network under test. The test system can be configured to control the test probe(s) via a specific active test platform including a central test unit. Furthermore, via the central test unit, the test system can automatically run IoT test procedures, can collect test results and can produce test reports and dashboards.

Download and upload data speeds and/or download/upload bandwidths can be tested.

The data transfer tests can be performed with different sizes of sent/received data, in particular with different number of data packets and/or different data volumes.

Data transfer quality and also data transfer integrity can be tested.

A test system configured to exchange signaling messages and to transport either IP data, non-IP data, or SMS to and from the MIoT network under test enables a test of the most common signal message and data types with the test system.

Test system in which at least one test probe is configured to be placed in a serving network, i.e. either in a home IoT network under test for national MIoT services test, or in a visiting MIoT network under test for international MIoT roaming services test have been proven to be essential for the most common testing requirements.

This in particular holds true for a test system which is configured to test MIoT serving network under test on different test connect and communication paths across different MIoT network (2) components via MME, S-GW, P-GW, SCEF, IWK-SCEF, SCS, AS, as well as across roaming interfaces S6a, S8, SGd, T7.

A test system configured to communicate with a MIoT platform under test via MQTT/MQTT-SN messages and to verify an availability and connectivity of the MIoT platform via the underlying MIoT network, and an end-to-end data transfer and a data integrity between the MIoT platform and the mobile IoT devices is suitable for IoT application platform testing.

A test method for testing MIoT services quality of the serving MIoT network under test has the advantages described above with respect to the test system.

With a method that includes configuring and initiating test probe to EPS attach in the serving MIoT network under test, verifying the completion of the attach procedure, monitoring and recording all test events, and repeating these test steps according to test schedule, by simulating/emulating respective mobile IoT devices with the test probe within the IoT network, the IoT service availability of the network can be tested. The test steps may be periodically repeated during the test method. The test results recorded may be aggregated and may further be statistically evaluated.

With a test method that includes initiating the test probe to ping a server in the serving MIoT network under test, verifying the completion of the ping procedure, monitoring and recording all test events, and repeating these steps according to test schedule, a mobile IoT connectivity can be performed. Here again, the repeating step may be periodically repeated and the test results may be aggregated for further statistical evaluation.

Via such ping test, an IoT network accessibility for the pinging test probe and/or a round-trip time of the ping/echo can be evaluated.

A test method may include enabling PSM (Power Saving Mode), hereby setting values of the T3324 Active Timer and the T3412 Timer extended at the test probe, initiating an EPS attach of the test probe in the serving MIoT network, verifying the completion of the attach procedure, verifying whether the timer values are accepted by the service MIoT network, comparing these values with the ones requested by the test probe, verifying whether the extended periodic TAU (Tracking Area Update) procedure is accepted, monitoring and recording all test events, and repeating the above-mentioned test steps according to test schedule With this test method a power saving function of the respective mobile IoT device can be tested. Here again, the repeating step may be periodically repeated, and the test results may be aggregated for further statistical evaluation.

As part of such power saving test method, mobile-terminated data transfer in combination with a power saving function to be managed by the IoT serving network under test may be tested by sending downlink data towards the test probe during T3324 active timer running, verifying that the test probe receives the complete downlink data packets, monitoring and recording all test events and repeating the above-mentioned test according to a given schedule. Here again, the repeating step may be periodically repeated, and the test results may be aggregated for further statistical evaluation.

Further, in such power saving test, mobile-terminated SMS in combination with power saving function to be managed by the IoT serving network under test can be tested by sending an SMS to the test probe during T3324 active timer running, verifying that the test probe receives the SMS, monitoring and recording all test events and repeating the above-mentioned test according to a given test schedule. Here again, the repeating step may be periodically repeated, and the test results may be aggregated for further statistical evaluation.

A further test method may include enabling eDRX (Extended Discontinuous Reception), hereby setting values of the eDRX cycle length and the paging time window (PTW) at the test probe, initiating an EPS attach of the test probe in the serving IoT network under test, verifying the completion of the attach procedure, verifying whether the eDRX cycle length and the PTW value accepted by the service IoT network, comparing these values with the ones requested by the test probe, monitoring and recording all test events, and repeating the above-mentioned test steps according to test schedule. In this test method, eDRX functionality can be tested and, in the consequence, the capability of further power saving functions can be evaluated. Here again, the repeating step may be periodically repeated, and the test results may be aggregated for further statistical evaluation.

In such eDRX test method, mobile-terminated data transfer in combination with eDRX function to be managed by the IoT serving network under test can be tested by sending downlink data towards the test probe within the paging time window (PTW), verifying that the test probe receives the complete downlink data packets, monitoring and recording all test events and repeating the above-mentioned test according to a given test schedule. Here again, the repeating step may be periodically repeated, and the test results may be aggregated for further statistical evaluation.

Further, in such eDRX test method, mobile-terminated SMS in combination with eDRX function to be managed by the IoT serving network under test may be tested by sending an SMS to the test probe within the paging time window (PTW), verifying that the test probe receives the SMS, monitoring and recording all test events and repeating the above-mentioned test according to a given test schedule.

Here again, the repeating step may be periodically repeated, and the test results may be aggregated for further statistical evaluation.

With a test method that includes verifying whether the test probe is requested by the serving IoT network for detach after an EPS attach or after mobile origination (MO) or mobile termination (MT) data transfer, repeating this verification step multiple times, and aggregating the multiple test results, indicating a default EPS bearer context cut-off ratio, a connect retainability and unsolicited network-initiated detach request may be tested.

A test method may include deploying a TCP transport protocol, initiating a mobile originated IoT data transfer from the test probe to an application server located in the home network (HPMN), verifying whether the IoT data is correctly received by the application server, repeating this verification step multiple times, aggregating the multiple test results, indicating the default EPS bearer context cut-off ratio, deploying a UDP transport protocol, repeating IoT MO data transfer test, deploying a non-IP data delivery mechanism over NAS signaling, and repeating IoT MO data transfer test. With such a test method, mobile origination (MO) data transfer can be tested.

A test method may include deploying TCP transport protocol, initiating an application server located in the home network (HPMN) to transmit IoT data to the test probe, verifying whether the IoT data is completely received by the test probe, repeating this verification step multiple times, aggregating the multiple test results, indicating the default EPS bearer context cut-off ratio, deploying a UDP transport protocol, repeating IoT MT data transfer test, deploying a non-IP data delivery mechanism over NAS signaling, and repeating IoT MT data transfer test. With such a test method, mobile termination (MT) data transfer can be tested.

Mobile originated SMS transmission can be tested with a test method that includes initiating the test probe to send an SMS to a partner test probe in the home network (HPMN), verifying whether the SMS is correctly delivered to the partner test probe, repeating the test multiple times, and aggregating the multiple test results.

Mobile terminated SMS delivery can be tested with a test method that includes initiating a partner test probe in a home network (HPMN) to send an SMS to the test probe in the serving IoT network, verifying whether the SMS submitted by the partner test probe is correctly delivered to the test probe in the serving IoT network, repeating the test multiple times, and aggregating the multiple test results.

Data and SMS data delivery can be tested after and during power saving mode.

Exemplary embodiments of the invention are further described with reference to the accompanying drawings.

DETAILED DESCRIPTION

Figure 1:
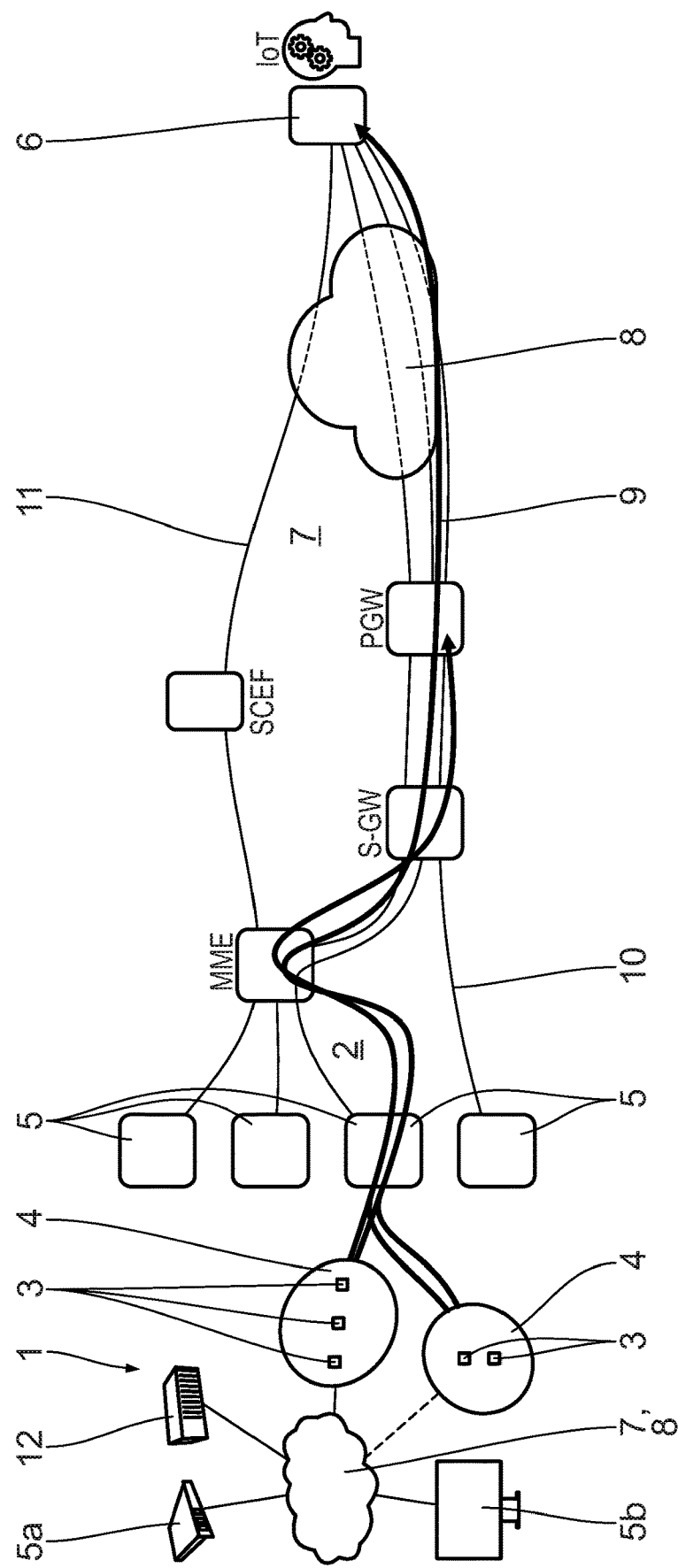
FIG. 1 shows main components of an active test system for a mobile IoT (Internet of Things) network including at least one test probe connected to the IoT network via a radio interface.

FIG. 1 shows main components of an active test system 1 for a mobile IoT (Internet of Things) network 2 which is represented by a variety of communication lines shown in FIG. 1. A communication line can be either a pure signaling path, a signaling path embedding IoT data, or an IoT data transport path. The mobile IoT (MIoT) network 2 provides connectivity and services to mobile IoT devices of low power wide area (LPWA) technologies. A used LPWA frequency bandwidth regularly is on a licensed spectrum. The LPWA technology installed may be LTE-M, and/or NB-IoT.

Throughout this application, in particular with respect to the standardized specifications of IoT networks, it is referred to the following references:

GSM Association; official document CLP.28-NB-IoT Deployment Guide to Basic Feature set Requirements, version 1.0, Aug. 2, 2017 (White Paper of the GSMA);
Technical specification 3GPP TS 23.682, V.15.8.0, Release 15, March 2019.

Mobile IoT networks to be tested via the test system 1 may also install EC-GSM-IoT (Extended Coverage GSM IoT). The other communication technologies may also be used for additional network access for machine-to-machine communications, such as Bluetooth Mesh Networking, Light-Fidelity (Li-Fi), Near-Field Communication (NFC), Wi-Fi, ZigBee or Z-Wave as examples for a wireless communication with short-range, LTE-Advanced or LTE-Standard as examples for medium-range wireless, LoRaWan, Sigfox, or Weightless, or Very Small Aperture Terminal (VSAT) as examples for long-range wireless communication and Ethernet or Power-Line Communication as examples for a wired communication.

The test system 1 of FIG. 1 includes one or multiple test probes 3 which are components of a local unit 4 of the test system 1. FIG. 1 shows several examples of such local units 4. The local unit 4 may include 1 to 4 or even more, e.g. up to 15 or more test probes 3. The test probes 3 are connected to the IoT network 2 via a radio interface 5. Respective interfaces 5 together with LTE RAN (Radio Access Network) are schematically shown in FIG. 1 and may be embodied by a plurality of antenna sites.

A central test unit 5a is connected to the test probes 3 via an internet network 7, 8. Such connection may be a permanent secure IP connection, e.g. via a VPN server and an LTE/GPRS/EDGE/HSPA modem or may be a quasi-permanent IP connection which is established via a VPN server when required during testing.

In the embodiment of FIG. 1, the network 7, which may be a wireless backhaul network or a fixed IP network, includes the internet 8 and further includes components of an Evolved Packet Core (EPC) of a 3GPP LTE communication standard. In general, the components of the network 7 are also components of the IoT network 2, but this is not mandatory, some of the components of the network 7 may be independent from the IoT network 2.

Further parts of the test system 1 shown on the left side of FIG. 1 are test clients 5b which also are connected to the network 7, 8 of the test system 1.

Shown in FIG. 1 are two main test communication paths between the test probes 3 and an Application Server (AS) 6 acting as IoT platform. A first, NB-IoT test communication path 9 runs from the attributed local radio interface 5 via a Mobile Management Entity (MME), further there are two split alternatives, either via a Serving Gateway (S-GW) and a Packet Data Network Gateway (P-GW) and the network 7 to the AS/IoT platform 6 (so-called direct mode), or via the test path 11, and SCEF (service Capability Exposure Function), Services Capability Server (SCS) and the network 7 to the AS/IoT platform 6 (so-called indirect mode).

A further LTE-M test communication path 10 runs directly from a local radio interface 5 to the S-GW, i.e. does not run via the MME, further via a Serving Gateway (S-GW) and a Packet Data Network Gateway (P-GW) and the network 7 to the AS/IoT platform 6.

All test probes are equipped with SIM. Connected to the internet 8, a SIM multiplexer 12 dispatches virtually the SIM data to the individual test probes in a fully secure and trusted way. The SIM multiplexer which is part of the test system 1 is known from DE 10 2005 027 027 B4.

The local unit 4 and the local unit 16 are equipped with a SIM multiplexer support.

Alternatively, to a SIM multiplexer support, the local unit 4 may include a support to carry multiple SIMs, e.g. up to 3 SIMs or more.

The local unit 4 is placed in a designated test field and connected to the test system. In praxis, a plurality of test probes 3 is arranged at different and in particular widespread locations covering a large national or international area. As a consequence, the at least one test probe 3 is configured to be placed either in a home IoT network under test for national IoT services test, or in a visiting IoT network under test for international IoT roaming services test.

The test system 1 is configured to run mobile IoT test procedures deploying end-to-end active test methodology between the at least one test probe 3 and the IoT network 2 under test.

Further, the test system 1 is configured to control the at least one test probe 3, is configured to automatically run the IoT test procedures, is configured to collect the test results and further is configured to produce test reports and/or dashboards.

The test system 1 is configured to exchange signaling messages, is configured to transport IP data and/or non-IP data and/or SMS to and from the IoT network 2 under test.

The test communication paths via the internet network 8 between the test probes 3 and the IoT platform 6 include a MQTT/MQTT-SN client/server structure where the test probes 3 are the MQTT clients and the IoT platform 6 is the server/MQTT broker. The IoT application data stored in the IoT platform can be retrieved, evaluated and verified via the messaging protocol MQTT (Message Queuing Telemetry Transport).

As further components within the networks and/or communication paths may serve a Services Capability Server (SCS) and/or an Application Server (AS). With respect to the arrangement of such SCS/AS it is referred to the technical specification 3GPP TS 23.682, in particular to FIG. 40.2-1a.

Further possible interfaces may work according to the standardized S6a, S8, SGd or T7 roaming interfaces.

Via the test methods or test procedures carried out by the test system 1, the availability and quality of the serving IoT network 2 under test can be tested. During the service availability test, in particular the timing of the respective test events can be monitored and recorded in the test central unit 5a.

The test methods explained are controlled by the test central unit 5a unless otherwise indicated.

An example of such a test method includes the following steps:

The respective test probe 3 is configured via the test client 5b and initiated to an evolved packet system (EPS) attach in the serving IoT network 2 under test. After the initiation of the EPS attach, the completion of the attach procedure, the received messages from the IoT network under test by the test probe 3 are verified by the test central unit 5a.

All test events during the configuration, initiating and verifying steps are monitored and recorded. These test steps are repeated according to a given test schedule. In particular, such repeating may be a periodically repeating of test steps. Further, such multiple test results are aggregated and are forwarded to a statistical evaluation and the test result is presented via the test client 5b to a human tester.

In a particular test method, the test probe is initiated to ping a server installed in the serving IoT network 2 under test or an IoT network component, e.g. P-GW.

The "ping" is done by using the respective IP software utility.

After such ping procedure, its completion is verified and again all test events are monitored and recorded, and the test steps are repeated according to the given test schedule.

In a further test method, a power saving function to be managed by the IoT serving network 2 under test can be tested. Such power saving function test includes the enabling of a power saving mode (PSM) at the respective test probe 3, hereby setting values of the T3324 active timer and the T3412 timer extended at the test probe 3 of the local unit 4. Then, an EPS attach of the test probe 3 in the serving IoT network 2 is initiated and the completion of the attach procedure is verified. In addition, it is verified whether the timer values are accepted by the service IoT network 2. This is done by comparing these values with the ones requested by the respective test probe 3. In addition, it is verified whether the extended periodic Tracking Area Update (TAU) procedure is completed. Again, all test events during this test method are monitored and recorded and the above-mentioned test is repeated according to the given schedule.

In a further test method, mobile-terminated data transfer in combination with the power saving function to be managed by the IoT serving network 2 under test is tested. To this end, downlink data towards the respective test probe 3 are sent during a time span the T3324 active timer is running. It is verified that the respective test probe 3 receives the complete downlink data packets.

Again, all test events during this test method are monitored and recorded and the above-mentioned test is repeated according to a given test schedule.

In a further test method, testing mobile-terminated SMS in combination with power saving function to be managed by the IoT serving network 2 under test, an SMS is sent to the test probe 3 during T3324 active timer running.

It than is verified whether the SMS is correctly delivered to the test probe. All test events during this test methods again are monitored and recorded, and the above-mentioned test method is repeated according to a given test schedule.

In a further test method, an eDRX (Extended Discontinuous Reception) function to be managed by the IoT serving network 2 under test is tested. In this method eDRX is enabled, hereby setting values of the eDRX cycle length and of the paging time window (PTW) at the respective test probe 3 of the local unit 4. In addition, an EPS attach of the test probe 3 in the serving IoT network 2 under test is initiated. A completion of such attach procedure is verified. Further, it is verified whether the eDRX cycle length and the PTW value are accepted by the service IoT network 2, comparing these values with the ones requested by the respective test probe 3. All test events of this method are monitored and recorded, and the above-mentioned test method is repeated according to a given test schedule.

In a further test method, mobile-terminated data transfer in combination with eDRX function to be managed by the IoT serving network 2 under test is tested. Here, downlink data are sent towards the respective test probe 3 within PTW (Paging Time Window). It is verified whether the test probe 3 receives the complete downlink data packets. All test events of this test method are monitored and recorded, and the above-mentioned test method is repeated according to a given test schedule.

In a further test method, mobile-terminated SMS in combination with eDRX function to be managed by the IoT serving network 2 under test is tested. Here, an SMS is sent to the respective test probe 3 within PTW. It is verified whether the SMS is correctly delivered to the test probe. All test events during this test method are monitored and recorded. The above-mentioned test method is repeated according to a given test schedule. In a further test method, the connection retainability of the IoT network 2 is tested. Here, it is verified whether the respective test probe 3 is requested by the service IoT network 2 for detach after an EPS attach or after mobile origination (MO) or mobile termination (MT) data transfer. This verification step is repeated multiple times. The multiple test results of this test method are aggregated. From this aggregation, a default EPS bearer context cut-off ratio is calculated.

In a further method, IoT MO data transfer provided by the serving IoT network 2 under test is tested. Here, a TCP (Transmission Control Protocol) transport protocol is deployed. Further, a mobile originated IoT data transfer from the respective test probe 3 is initiated to an application server 6 located in a home network (HPMN). It is verified whether the IoT data is correctly received by the application server 6. This verification step is repeated multiple times and the multiple test results are aggregated, indicating the default EPS bearer context cut-off ratio. In addition, an UDP (User Datagram Protocol) is deployed and the above-mentioned IoT MO data transfer test is repeated. In addition, a non-IP data delivery mechanism over NAS (Non-Access Stratum) signaling is deployed. Again, the IoT MO data transfer test is repeated.

In a further test method, an IoT MT (Mobile Termination) data transfer provided by the serving IoT network 2 under test is tested. Here, after deploying of a TCP transport protocol, an application server, i.e. the server of the IoT platform 6 located in the home network is initiated to transmit IoT data to the respective test probe 3. It is verified whether the IoT data is completely received by the respective test probe 3. Further steps of this test method including deployment of the UDP transport protocol and deployment of the non-IP data delivery mechanism over NAS signaling, correspond to those explained above with respect to the MO data transfer test method.

In a further test method, an MO SMS transmission via the serving IoT network 2 under test is tested. Here, the respective test probe 3 is initiated to send an SMS to a partner test probe 3 of local unit 4 in the home network (HPMN). It than is verified whether the SMS is correctly received by the partner test probe 3. This test is repeated multiple times and the multiple test results are aggregated for further statistical evaluation.

In a further test method, an MT SMS delivery via the serving IoT network 2 under test is tested. Here, a partner test probe 3 in a home network (HPMN) is initiated to send a SMS to the test probe 3 in the serving IoT network 2. It is verified whether the SMS submitted by the partner test probe 3' is correctly delivered to the respective test probe 3 in the serving IoT network 2. Again, this test is repeated multiple times and the multiple test results are aggregated.

Figure 2:
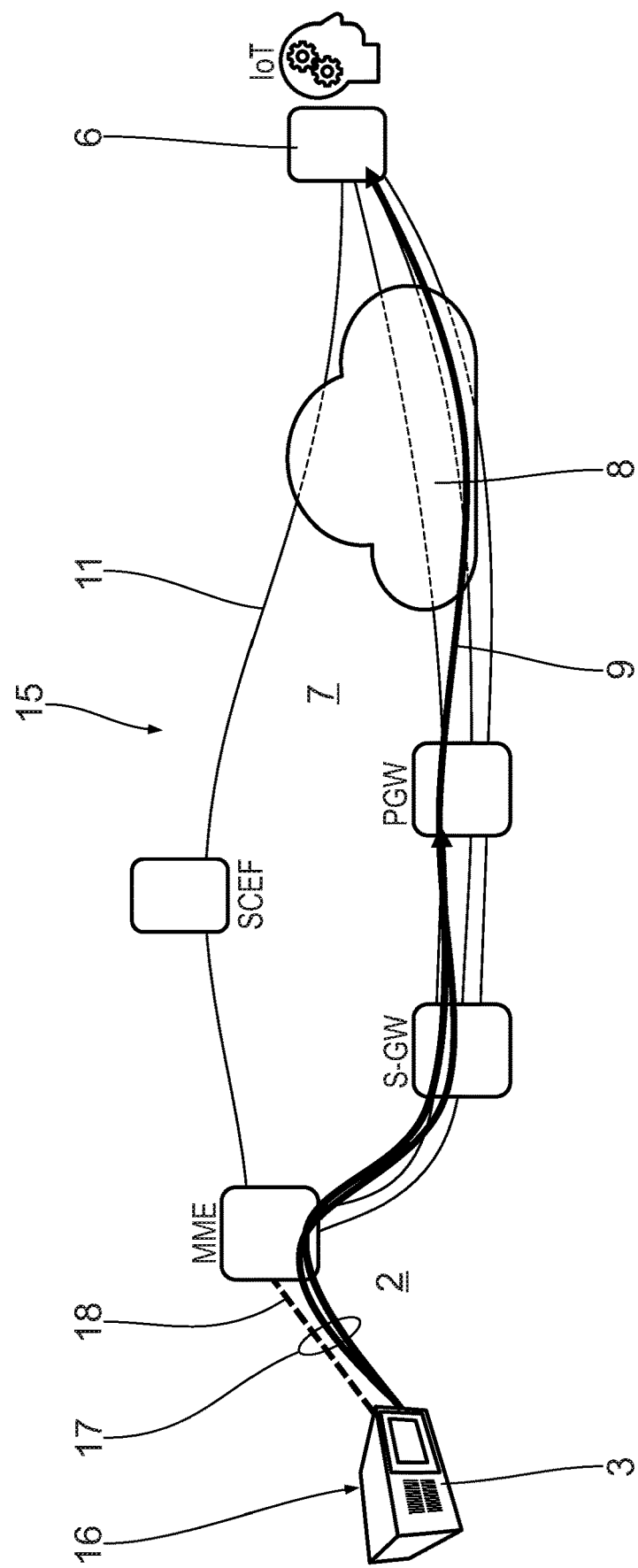
FIG. 2 shows in a depiction similar to FIG. 1, a further embodiment of a test system for a mobile IoT network including a test probe connected to the IoT network via an S1 interface.

With respect to FIG. 2, a further embodiment of a test system 15 for a mobile IoT network is described. Components and functions which correspond to those explained above with respect to FIG. 1 show the same reference numerals and are not discussed in detail again. A central test unit, test clients and SIM multiplexer which also may be present in the test system 15 in addition to a local unit are not shown in FIG. 2.

In the test system 15, a local unit 16 including the test probes 3 is embodied as S1 core unit which is connected to the IoT network 2 via an S1 interface 17. A communication line 18 via this S1 interface 17 is realized as emulated eNodeB (Evolved NodeB). Details with respect to an embodiment of an S1 interface and the protocol can be found in 3GPP TS 36. 413 V.15.5.0, Release 15, March 2019: "Evolved Universal Terrestrial Access Network (E-UTRAN); S1 Application Protocol (S1AP)".

Figure 3:
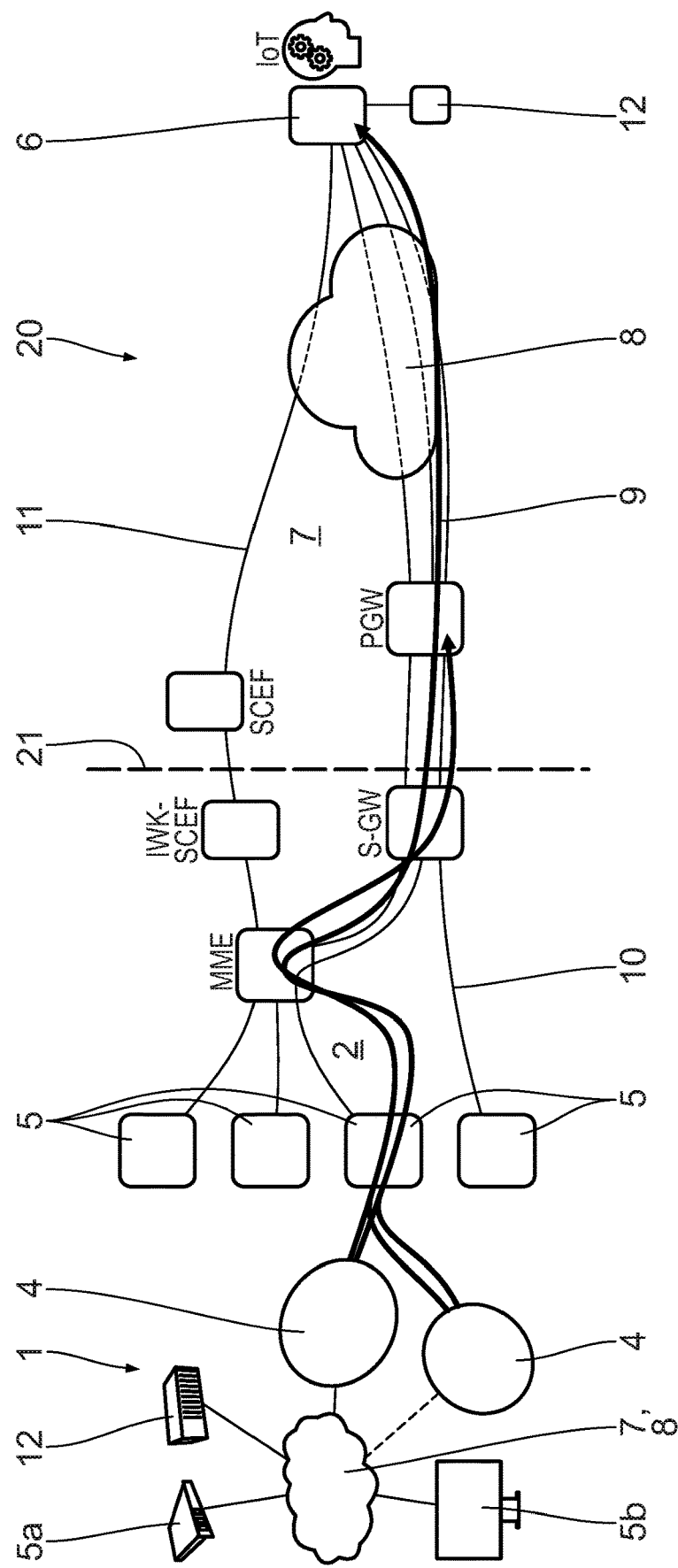
FIG. 3 shows in a depiction similar to FIG. 1, an embodiment of the test system configured to test an IoT serving network on test connection paths across roaming interfaces.

FIG. 3 shows another embodiment of a test system 20. Components and functions which correspond to those already explained with respect to FIGS. 1 and 2 have the same reference numerals and are not discussed in detail again.

The test system 20 provides test for connectivity and services to mobile IoT devices in roaming conditions. Here, communication via lines 9, 10 and 11 is done between a home public mobile network (HPMN) and a visiting public mobile network (VPMN) across a border 21. To this end, in the communication line 11, in addition to the SCEF module in the HPMN a further interworking SCEF (IWK-SCEF) module is arranged in the VPMN.

This roaming scheme is possible with the radio interfaces 5 shown again in FIG. 3 as well as with the S1 interface 17 according to FIG. 2 (not shown in FIG. 3).

Figure 4:
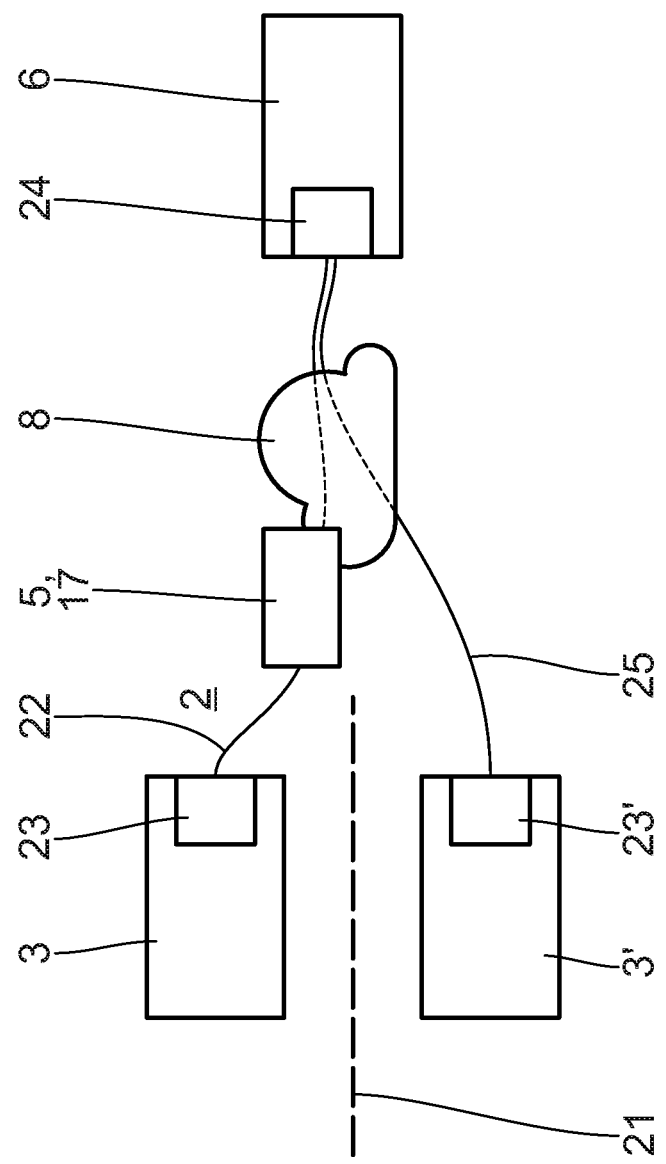
FIG. 4 shows main components of an embodiment of the test system including two test probes configured to communicate with an IoT application platform of an IoT service via MQTT/MQTT-SN messages.

FIG. 4 shows components of a further embodiment of a test system for a mobile IoT network including details with respect to testing data transfer between different test probes 3, 3' wherein such different test probes 3, 3' may be attributed to different, e.g. home/visiting, public mobile networks. Components and functions which correspond to those explained above with respect to FIGS. 1 to 3 have the same reference numerals and are not discussed in detail again.

A first one of the test probes, test probe 3, is connected to the IoT platform 6 via a test communication path 22 which can include a radio interface 5 or a S1 interface 17. The test probe 3 includes an MQTT/MQTT-SN client 23 which communicates via the communication line 22 with an MQTT/MQTT-SN server/broker 24 of the IoT platform 6 under test.

Another test probe, test probe 3', communicates in FIG. 4 with the IoT platform 6 under test via another test communication path 25 which also may include a radio interface 5 or an S1 interface 17. To this end, the further test probe 3' also includes an MQTT/MQTT-SN client 23'.

By using in particular one of the test methods explained above, the relevant IoT data sent by test probe 3 and stored in the platform under test 6 can be retrieved by the test probes 3'. The retrieved data is compared with the original data sent. The corresponding test verdict can be assigned.

The test probes 3, 3' may be placed in the same home network. Alternatively, and as indicated in FIG. 4, the test probes 3 and 3' may be located within separated networks. For example, and as shown in FIG. 4, the test probe 3 may be placed in a visiting public network VPMN and the further test probe 3' may be located in a home public mobile network HPMN. With such a configuration, IoT application platform tests under IoT device roaming as explained above can be globally carried out.

What is claimed is:

1. An active test system (1; 15; 20) for a mobile IoT network (2) providing connectivity and services to mobile IoT (MIoT) devices of low power wide area (LPWA) technologies,
with
at least one test probe (3; 3, 3') connected to the MIoT network (2) via an LTE-Uu interface (5) and/or
at least one test probe (3; 3, 3') connected to the MIoT network (2) via a S1 interface (17),
with a central test unit (5a), connected (8) to the at least one test probe (3; 3, 3') via a wireless backhaul network or a fixed IP network (7), and
with a SIM multiplexer (12) to transfer SIM data to the at least one test probe (3; 3, 3') in test fields,
wherein the test system tests services quality and service availability of the MIoT network under test,
wherein the test system configures the at least one test probe and initiates that at least one test probe to EPS (Evolved Packet System) attach in the MIoT network under test,
wherein the test system verifies completion of the EPS attach procedure,
wherein the test system monitors and records all test events, and
wherein the test system repeats the above-mentioned test steps according to test schedule.

2. The test system according to claim 1, configured to exchange signaling messages and to transport either IP data, non-IP data, or SMS (Short Message Service) to and from the MIoT network (2) under test.

3. The test system according to claim 1, wherein the at least one test probe (3; 3, 3') is configured to be placed in a serving network, i.e. either in a home IoT network (2, HPMN) under test for national MIoT services test, or in a visiting MIoT network (2, VPMN) under test for international MIoT roaming services test.

4. The test system according to claim 3, configured to test MIoT serving network under test on different test connect and communication paths across different MIoT network (2) components via MME (Mobile Management Entity), S-GW (Serving Gateway), P-GW (Packet Data Network Gateway), SCEF (Service Capability Exposure Function), IWK-SCEF (further interworking SCEF), SCS (Services Capability Server), AS (Application Server), as well as across roaming interfaces S6a, S8, SGd, T7.

5. The test system according to claim 1, configured to communicate with a MIoT platform (6) under test via MQTT (Message Queuing Telemetry Transport)/MQTT-SN (MQTT for Sensor Networks) messages and to verify an availability and connectivity of the MIoT platform (6) via the underlying MIoT network, and an end-to-end data transfer and a data integrity between the MIoT platform (6) and the mobile IoT devices.

6. A test method, comprising:
providing the test system according to claim 1; and
testing MIoT services quality of the serving MIoT network under test.

7. The test method according to claim 6, further comprising testing IoT network connectivity, including the following steps:

initiating the test probe to ping a server in the serving MIoT network under test,
verifying the completion of the ping procedure,
monitoring and recording all test events,
repeating the above-mentioned test steps according to test schedule.

8. The test method according to claim 6, further comprising testing power saving function to be managed by the MIoT serving network under test, including the following steps:
enabling PSM (Power Saving Mode), hereby setting values of the T3324 Active Timer and the T3412 Timer extended at the test probe,
initiating an EPS attach of the test probe in the serving MIoT network,
verifying the completion of the attach procedure,
verifying whether the timer values are accepted by the service MIoT network, comparing these values with the ones requested by the test probe,
verifying whether the extended periodic TAU (Tracking Area Update) procedure is accepted,
monitoring and recording all test events,
repeating the above-mentioned test steps according to test schedule.

9. The test method according to claim 6, further comprising testing eDRX function to be managed by the IoT serving network under test, including the following steps:
enabling eDRX (Extended Discontinuous Reception), hereby setting values of the eDRX cycle length and the paging time window (PTW) at the test probe,
initiating an EPS attach of the test probe in the serving MIoT network under test,
verifying the completion of the attach procedure,
verifying whether the eDRX cycle length and the PTW value accepted by the serving MIoT network, comparing these values with the ones requested by the test probe,
monitoring and recording all test events,
repeating the above-mentioned test steps according to test schedule.

10. The test method according to claim 6, further comprising testing the connect retainability of the MIoT network, including the following steps:
verifying whether the test probe is requested by the serving MIoT network for detach after an EPS attach or after mobile origination (MO) or mobile termination (MT) data transfer,
repeating this verification step multiple times,
aggregating the multiple test results, indicating a default EPS bearer context cut-off ratio.

11. The test method according to claim 6, further comprising testing an IoT mobile origination (MO) data transfer provided by the serving IoT network under test, including the following steps:
deploying a TCP transport protocol,
initiating a mobile originated IoT data transfer from the test probe to an application server located in the home network (HPMN),
verifying whether the IoT data is correctly received by the application server,
repeating this verification step multiple times,
aggregating the multiple test results, indicating the default EPS bearer context cut-off ratio,
deploying a UDP (User Datagram Protocol) transport protocol, repeating IoT MO data transfer test,
deploying a non-IP data delivery mechanism over NAS signaling,
repeating IoT MO data transfer test.

12. The test method according to claim 6, further comprising testing an IoT mobile termination (MT) data transfer provided by the serving MIoT network under test, including the following steps:
deploying TCP transport protocol,
initiating an application server located in the home network (HPMN) to transmit IoT data to the test probe,
verifying whether the IoT data is completely received by the test probe,
repeating this verification step multiple times,
aggregating the multiple test results, indicating the default EPS bearer context cut-off ratio,
deploying a UDP transport protocol,
repeating IoT MT data transfer test,
deploying a non-IP data delivery mechanism over NAS signaling,
repeating IoT MT data transfer test.

13. The test method according to claim 6, further comprising testing an MO (mobile origination) SMS transmission via the serving MIoT network under test, including the following steps:
initiating the test probe to send an SMS to a partner test probe in the home network (HPMN),
verifying whether the SMS is correctly delivered to the partner test probe,
repeating the test multiple times,
aggregating the multiple test results.

14. The test method according to claim 6, further comprising testing an MT (mobile termination) SMS delivery via the serving MIoT network under test, including the following steps:
initiating a partner test probe in a home network to send an SMS to the test probe in the serving IoT network,
verifying whether the SMS submitted by the partner test probe is correctly delivered to the test probe in the serving IoT network,
repeating the test multiple times,
aggregating the multiple test results.

15. An active test system (1; 15; 20) for a mobile IoT network (2) providing connectivity and services to mobile IoT (MIoT) devices of low power wide area (LPWA) technologies,
with
at least one test probe (3; 3, 3') connected to the MIoT network (2) via an LTE-Uu interface (5) and/or
at least one test probe (3; 3, 3') connected to the MIoT network (2) via a S1 interface (17),
with a central test unit (5a), connected (8) to the at least one test probe (3; 3, 3') via a wireless backhaul network or a fixed IP network (7), and
with a SIM multiplexer (12) to transfer SIM data to the at least one test probe (3; 3, 3') in test fields
wherein the at least one test probe (3; 3, 3') is configured to be placed in a serving network, i.e. either in a home IoT network (2, HPMN) under test for national MIoT services test, or in a visiting MIoT network (2, VPMN) under test for international MIoT roaming services test, and
wherein the active test system is configured to test MIoT serving network under test on different test connect and communication paths across different MIoT network (2) components via MME (Mobile Management Entity), S-GW (Serving Gateway), P-GW (Packet Data Network Gateway), SCEF (Service Capability Exposure Function), IWK-SCEF (further interworking SCEF), SCS (Services Capability Server), AS (Application Server), as well as across roaming interfaces S6a, S8, SGd, T7.

16. An active test system (1; 15; 20) for a mobile IoT network (2) providing connectivity and services to mobile IoT (MIoT) devices of low power wide area (LPWA) technologies,
with
- at least one test probe (3; 3, 3') connected to the MIoT network (2) via an LTE-Uu interface (5) and/or
- at least one test probe (3; 3, 3') connected to the MIoT network (2) via a S1 interface (17),
- with a central test unit (5*a*), connected (8) to the at least one test probe (3; 3, 3') via a wireless backhaul network or a fixed IP network (7), and
- with a SIM multiplexer (12) to transfer SIM data to the at least one test probe (3; 3, 3') in test fields,
- wherein the active test system is configured to communicate with a MIoT platform (6) under test via MQTT (Message Queuing Telemetry Transport)/MQTT-SN (MQTT for Sensor Networks) messages and to verify an availability and connectivity of the MIoT platform (6) via the underlying MIoT network, and an end-to-end data transfer and a data integrity between the MIoT platform (6) and the mobile IoT devices.

\* \* \* \* \*